Dec. 13, 1966  L. E. ASKE  3,291,893
HERMETICALLY SEALED CASING AND LEAD-IN CONDUCTOR
Filed Dec. 6, 1961

*INVENTOR.*
LEONARD E. ASKE
BY Charles J. Ungemach

ATTORNEY.

United States Patent Office 3,291,893
Patented Dec. 13, 1966

3,291,893
HERMETICALLY SEALED CASING AND LEAD-IN CONDUCTOR
Leonard E. Aske, Minneapolis, Minn., assignor to Honeywell Inc., a corporation of Delaware
Filed Dec. 6, 1961, Ser. No. 157,445
5 Claims. (Cl. 174—50.55)

This invention relates to control apparatus and more particularly to a wire which is hermetically sealed so as to allow no air to pass lengthwise through the wire. It is the purpose of this invention to provide a wire which will allow the passing of a conductor through the wall of a hermetically sealed chamber allowing it to remain hermetically sealed since the wire itself is hermetically sealed. This eliminates the necessity for the standard hermetically sealed AN connectors or headers.

Hermetically sealed wire has long been desired, but great difficulty has been experienced by the industry in producing such wire. Inherently, when wire is made air passages are naturally formed which cannot be filled without great difficulty. According to the present invention hermetically sealed wire can be manufactured in an easy and inexpensive manner. Briefly the process comprises surrounding the conductive core with woven glass insulation to provide intentional air passages throughout the length and then surrounding both the core and the insulation with a sheath such as copper. To provide the hermetical seal, the wire is then placed in a bath of epoxy resin or other insulative sealing material and a vacuum or pressure differential is applied to the wire to draw out all of the air and to fill the spaces with the epoxy resin. Since the glass insulation is woven to prove intentional passages, it acts as a wick and aids in pulling the fluid compound into the wire to insure a higher quality seal than could previously be obtained. The wire is then heated to cure or harden the sealing material and thus hermetically seal the wire.

It is therefore, the object of this invention to provide a hermetically sealed wire. Further it is the object of this invention to provide a means for passing electric connections through the walls of hermetically sealed containers.

Figure 1:
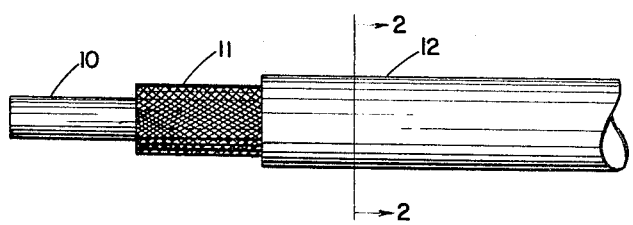
Figure 2:
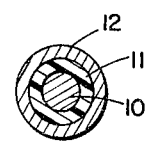
Figure 3:
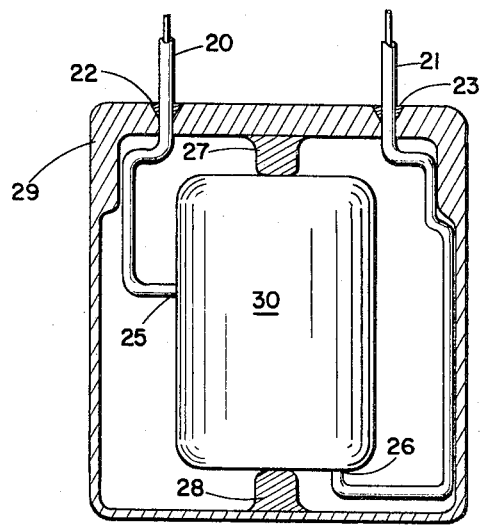

These and other objects will become apparent upon examination of the specification, claims and drawings in which:

FIGURE 1 is a side view of an electric wire of the present invention;
FIGURE 2 is a cross section of the wire of FIGURE 1 taken along lines 2—2 of FIGURE 1; and
FIGURE 3 is a sectional view of an instrument incorporating the improved wire of the present invention.

Referring to the drawings, FIGURES 1 and 2 show a single conductor wire illustrating the invention. The wire comprises a solid conducting core 10, which may be of copper. The core is surrounded by insulation 11, which may be of woven glass or other material which acts as a wick and which may be permeated by epoxy resin or some other appropriate insulative sealing compound. The insulation 11 in turn is surrounded by a sheath 12, which may also be of copper. The insulation 11, when permeated with sealing compound, so completely fills the space between the core 10 and sheath 12 that a hermetic seal along the longitudinal axis of the wire is produced.

To accomplish the hermetic sealing of the wire, the following steps are taken: (1) A relatively short piece of the wire shown in FIGURE 1, preferably under 18 inches in length, is placed in an appropriate bath of insulative sealing material such as epoxy resin in liquid form; (2) The wire and the bath are exposed to a vacuum so that the air in the wire is allowed to bubble out and be replaced by the sealing material. The wicking action of the insulation 11 aids in this process; (3) The vacuum is removed and the original atmospheric pressure restored. This return of pressure helps force the sealing compound into the wire. If desired, pressure in excess of atmospheric pressure may be applied to further force the sealing material into the wire; (4) The wire is removed from the bath; (5) The wire is placed in an oven or heat chamber and heat is applied until the sealing material has hardened; and (6) The wire is removed from the oven for use.

It is seen that the insulating wire is hermetically sealed and it may thus be cut into shorter pieces, each of which will itself be sealed.

FIGURE 3 shows a simple application for the above discussed wire. In FIGURE 3 it is desired that the contents of a gyro case 29 be hermetically sealed and the problem arises in passing electrical conductors through the case without affecting the seal. Where as prior art devices have resorted to special connectors and sealed headers which are expensive and often difficult to employ, the present invention provides an inexpensive and easily applied solution to the problem. Because the wire of the present invention is hermetically sealed in its longitudinal direction a solution to the problem is readily obtained by passing the wire itself through the casing 29 as shown in FIGURE 3. The wires 20 and 21 pass through holes in the gyro case 29 at positions 22 and 23 and are connected at points 25 and 26, for example, to the electric apparatus housed in the rotor member 30 of the gyro. The rotor member 30 may be conventionally secured to the casing 29 by the rotor mount members 27 and 28. At points 22 and 23 on the casing 29 where the wires 20 and 21 enter the instrument the copper jacket 12 of the wire shown in FIGURE 1 is soldered to the gyro case 29 to produce a hermetic seal. It should be realized that the outer sheath 12 may be of any material which can be bonded to the surface of an instrument such as the casing 29.

While the invention has been described with reference to certain specific embodiments, it is obvious that many applications and variations coming within the spirit of the invention are possible. Therefore, it is intended that there be no limitations in the invention, except those necessitated by the scope of the claims.

What I claim is:
1. An electric wire hermetically sealed along its longitudinal axis, said wire comprising:
   a conductive core;
   a concentrically arranged insulative web having a strong wicking characteristic;
   a metallic protective sheath concentrically surrounding said insulative web; and
   insulative sealing material impregnating said web and providing a hermetic seal between said conductive core and said protective sheath, along the longitudinal axis of said wire.
2. An electric wire hermetically sealed along its longitudinal axis, said wire comprising:
   a conductive copper core;
   a concentrically arranged insulative woven glass web having a strong wicking characteristic;
   a protective metallic sheath concentrically surrounding said insulative web; and
   epoxy resin impregnating said web and providing a hermetic seal along the longitudinal axis of said wire, between said conductive core and said protective sheath.
3. In an electric instrument having a hermetically sealed casing, apparatus for providing electrical connections from the interior to the exterior of the casing, through an aperture of the casing, said apparatus comprising, in combination:

a longitudinally hermetically sealed electrical conductor extending through said aperture;

said conductor having a central conductive core for making the desired electrical connection to the instrument;

a porous insulative web concentrically arranged about said central core and extending along said core through said aperture in the casing;

a protective sheath of material which is bondable to the casing surrounding said web and extending along said web through said aperture in the casing;

insulative sealing material impregnating said web and providing a hermetic seal along the longitudinal axis of said electrical conductor between said central core and said protective sheath; and means bonding said sheath to the casing to provide a hermetically sealed instrument.

4. In an electrical instrument having a hermetically sealed metal casing, apparatus for providing electrical connections from the interior to the exterior of said casing, through an aperture in the casing, said apparatus comprising, in combination:

a longitudinally, hermetically sealed electrical wire extending through the aperture;

said wire having a central copper core for making the desired electrical connection to said instrument;

a porous glass insulative web surrounding said core and extending along said core through said aperture in the casing;

a protective metallic sheath surrounding said web said sheath extending along said web through said aperture in the casing and being soldered to the casing to provide a hermetic seal between said metallic sheath and said metal casing; and epoxy resin impregnating said web and providing a hermetic seal along the longitudinal axis of said electrical conductor between said central core and said protective sheath to provide a hermetically sealed instrument.

5. In an electric instrument having a hermetically sealed metal casing having at least one flat wall, apparatus for providing a plurality of electrical connections from the interior to the exterior of said casing through a plurality of apertures in the casing, said apparatus comprising, in combination:

a plurality of longitudinally hermetically sealed wires extending through said apertures, said wires each having a central copper core for making the desired electrical connections to the instrument;

a porous glass insulative web surrounding each said core and extending along each said core through said apertures in the casing;

a protective metallic sheath surrounding each said web said sheath extending along each said web through said aperture in the flat wall of the casing and being soldered to said casing at said apertures to provide a hermetically sealed instrument; and epoxy resin impregnating each said web and providing a hermetic seal along the longitudinal axis of said electrical conductor between said central core and said protective sheath to provide a hermetically sealed instrument.

References Cited by the Examiner

UNITED STATES PATENTS

| | | | |
|---|---|---|---|
| 2,141,910 | 12/1938 | Hayman | 174—102 |
| 2,289,734 | 7/1942 | Scott et al. | 174—102 X |
| 2,587,916 | 3/1952 | Squier. | |
| 2,636,072 | 4/1953 | Lamoreaux | 174—55 X |
| 2,883,308 | 4/1959 | Yamada | 174—110 X |

FOREIGN PATENTS

| | | |
|---|---|---|
| 207,934 | 5/1959 | Australia. |
| 219,163 | 10/1957 | Australia. |
| 597,686 | 5/1960 | Canada. |

LEWIS H. MYERS, *Primary Examiner.*

JOHN P. WILDMAN, JOHN F. BURNS, *Examiners.*

R. F. ROTELLA, W. B. FREDERICKS, H. W. COLLINS, *Assistant Examiners.*